Patented Feb. 22, 1927.

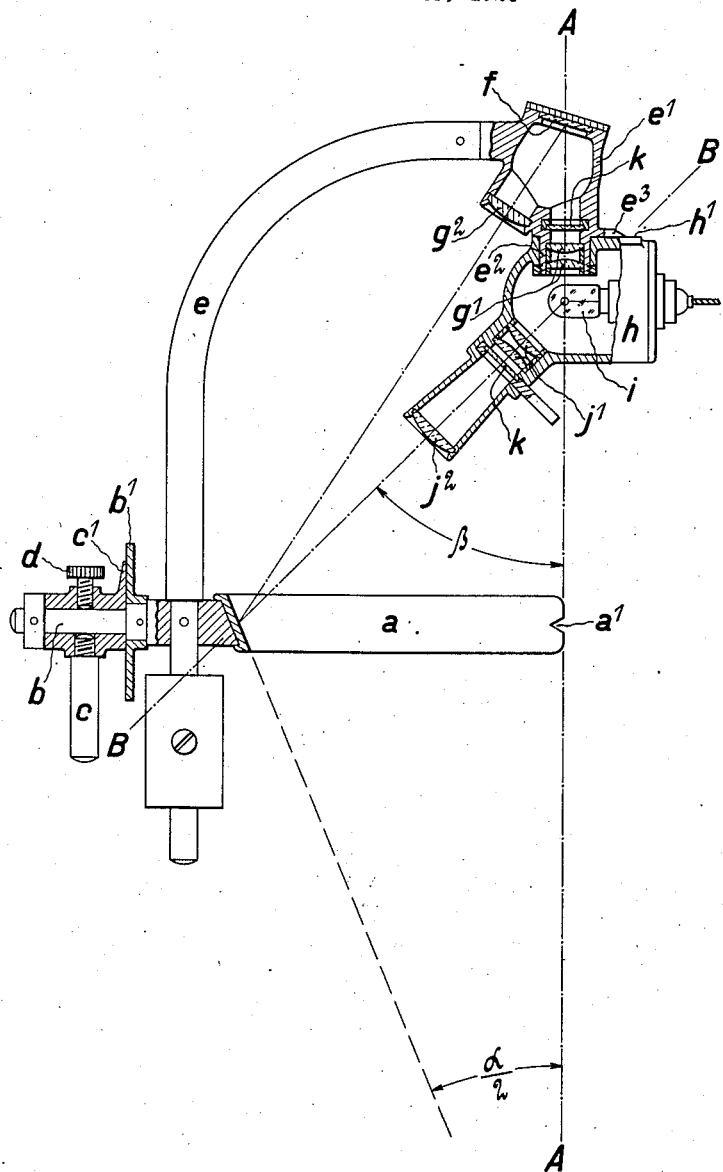

1,618,291

UNITED STATES PATENT OFFICE.

LUIGI MAGGIORE, OF SASSARI, ITALY, ASSIGNOR TO THE FIRM: CARL ZEISS, OF JENA, GERMANY.

DEVICE FOR DETERMINING THE FIELD OF VISION.

Application filed March 13, 1926, Serial No. 94,607, and in Germany March 12, 1925.

The field of vision of an eye may be determined by bringing a surface of rotation, which is, e. g. provided with a scale, before the eye to be tested, the axis of which surface of rotation traverses the eye, and by displacing, whilst the eye is looking straight ahead, on this surface of rotation in a plane perpendicular to the axis of this surface, a mark until it is no longer perceived by the eye to be tested.

The subject of the present invention constitutes a device for determining the field of vision according to the aforesaid method, which, whilst being of simple and suitable construction, may be easily operated and which at the same time admits of easily varying the colour of the mark which is frequently of importance for the test. According to the invention this can be attained by using as a mark a luminous spot for whose production is employed a source of light, which is disposed on the axis of rotation of the surface on which the mark is to travel, and a projection system which is rotatable about the axis of the projection surface, forming the said surface of rotation. Besides, one suitably provides in the vicinity of the source of light a fixed reflector system, if necessary with a second projection system through which a fixed luminous spot, also serving as a mark, is thrown upon the said projection surface.

The annexed drawing shows as an example a device according to the invention in a longitudinal section.

The device shown in the drawing contains a curved projection surface $a$ which is by means of a pivot $b$ rotatably supported in the head of a pivot of a stand $c$. By means of a screw $d$ it can be clamped in this head. The pivot $b$ carries a disc $b^1$, provided with a circle-division and opposed to an index $c^1$ fixed on the pivot of the stand $c$, as well as an arm $e$ at whose upper end is provided a head $e^1$ with a reflector $f$ and a projection system, consisting of a condenser $g^1$ and a collective lens $g^2$. The head $e^1$ is provided with a hollow pivot $e^2$ about which a casing $h$ may be rotated. In this casing there is fixed an electric glow lamp $i$ and a second projection system, consisting of a condenser $j^1$ and a collective lens $j^2$. Both projection systems produce a bright luminous spot each on the bow $a$. Between the glow lamp $i$ and the collective lens $j^2$, on the one hand, and the glow lamp $i$ and the reflector $f$, on the other hand, there is inserted in addition a colour filter $k$ each. Both filters are constructed as interchangeable slides and are generally chosen of like colour. The casing $h$ has a surface $h^1$, provided with a circle-division and opposed to an index $e^3$ fixed on the head $e^1$. The interior of the surface $a$ lies on a conical surface whose axis runs in the direction A—A. With this axis, which intersects the glow lamp $i$, also coincides the axis of the hollow pivot $e^2$ about which the casing $h$ with the glow lamp $i$ and the projection system $j^1$, $j^2$ is rotatable. The angle of centre $\alpha$ of the aforesaid conical surface is so chosen that conjointly with the angle $\beta$, which the axis of the system $j^1$, $j^2$ embraces with the axis of the cone A—A, it amounts to a little more than 90°. Thereby the angles, at which the light pencils traversing the lenses $g^2$ and $j^2$ are incident upon the surface $a$, become about equal to the angles at which the corresponding pencils are reflected by this surface, so that the luminous spot can be seen as bright as possible. At both its ends the surface $a$ is provided with indentations $a^1$.

In order to determine with the device the field of vision of an eye it is necessary to bring the eye to be tested into the centre of the straight lines connecting the two indentations. Whilst the eye is looking towards the fixed spot, produced at the centre of the bow by the system $g^1$, $g^2$, the user causes, by rotating the casing $h$, the second spot to travel until it is just no longer perceived by the eye. Thereupon the position of the index $e^3$ can be read off on the scale fixed on the surface $h^1$. According as the filters $k$ are removed or remain in position it is possible to carry out the method in white or coloured light, whereby by a corresponding selection of the filters the colour may be chosen as desired. Moreover, by rotating the device about the pivot $b$ with unchanged position of the eye, the size of the field of vision in various planes may be determined, whereby the position of the bow $a$ is read off at any one time on the scale fixed on the disc $b^1$.

I claim:

1. A device for determining the field of vision, containing a holder, a source of light disposed on this holder, a curved projection surface of rotation, and a projection system, adapted to receive light from the source of light and to produce a luminous spot on the said projection surface, the projection system being rotatable about an axis, traversing the source of light and intersecting the axis of the said projection system, and the axis of the said projection surface coinciding with the axis of rotation of the projection system.

2. A device for determining the field of vision, containing a holder, a source of light disposed on this holder, a curved projection surface of rotation, a projection system, adapted to receive light from the source of light and to produce a luminous spot on the said projection surface, the projection system being rotatable about an axis, traversing the source of light and intersecting the axis of the said projection system, and a second projection system fixed on the holder, also adapted to receive light from the source of light and to produce a luminous spot on the projection surface, the axis of the said projection surface coinciding with the axis of rotation of the projection system.

3. A device according to claim 2, containing a reflector system, inserted into the path of rays of the second projection system, and adapted to deflect the rays, emerging from the source of light so as to strike on the projection surface.

4. A device according to claim 1 in which the said projection surface is a conical surface whose axis coincides with the axis of rotation of the projection system, this conical surface turning its concave side towards the source of light and its angle of centre being approximately complementary to the angle which the axis of the projection system embraces with the said axis of rotation.

Prof. LUIGI MAGGIORE.